UNITED STATES PATENT OFFICE.

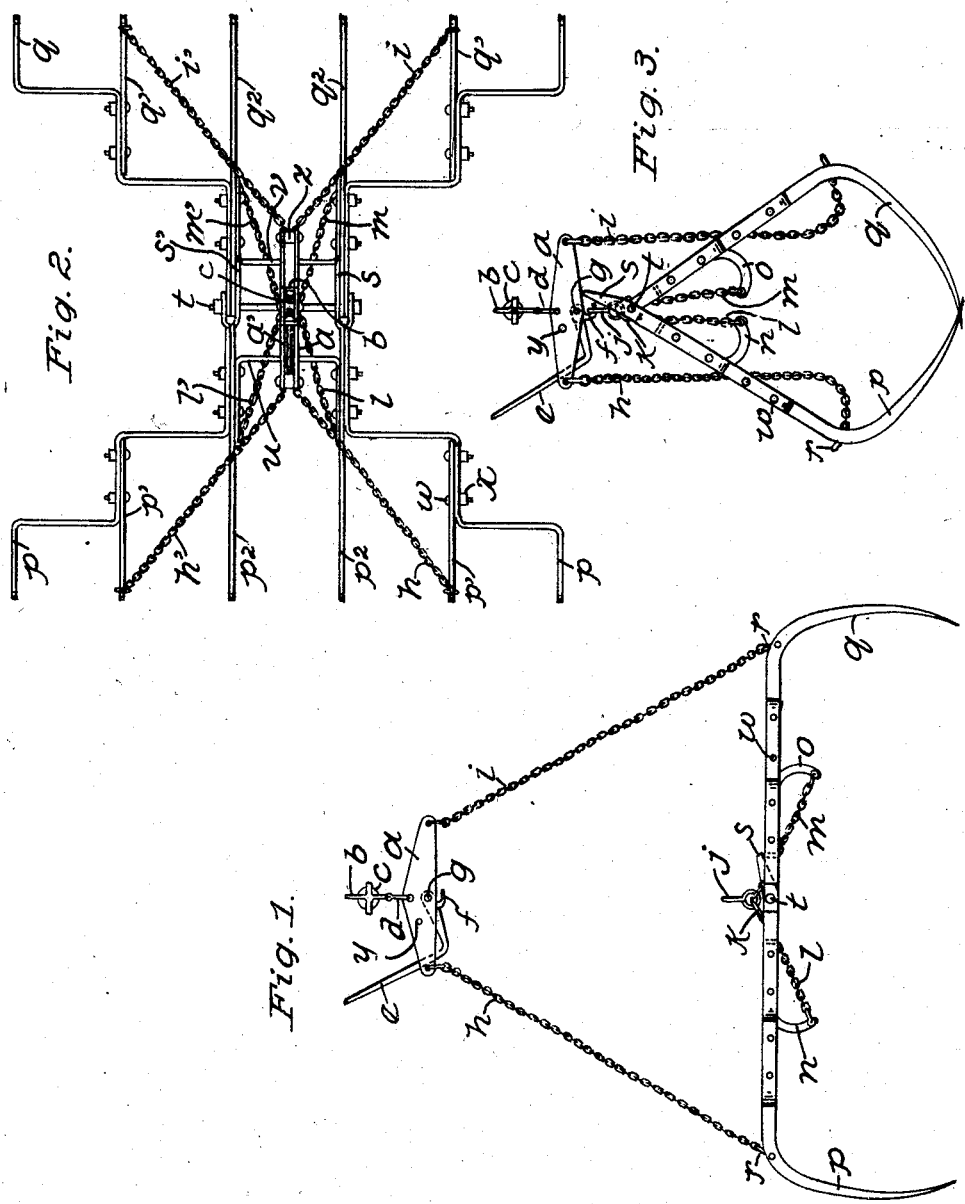

RASMUS PEDERSEN, OF PARKERSBURG, IOWA.

GRAPPLE.

992,800.  Specification of Letters Patent.  Patented May 23, 1911.

Application filed July 25, 1910. Serial No. 573,700.

*To all whom it may concern:*

Be it known that I, RASMUS PEDERSEN, a citizen of the United States of America, and a resident of Parkersburg, Butler county, Iowa, have invented certain new and useful Improvements in Grapples, of which the following is a specification.

My invention relates to improvements in grapples, and the object of my improvements is to provide a grapple having means for holding its tines closed together, also means for tripping and releasing said locking-means, the plurality of tines being of a certain strong construction with a provision of means for exercising thereon a powerful leverage. This object I have accomplished by the means which are hereinafter described and claimed, and which are illustrated in the accompanying drawings, in which:

Figure 1 is a side elevation of my improved grapple. Fig. 2 is an upper plan view thereof, and Fig. 3 is a side elevation of my said grapple in its closed and locked together position.

Similar characters of reference designate corresponding parts throughout the several views.

My improved grapple is primarily designed for use in connection with loading mechanism. The opposed tines have a common pivot-bolt $t$. The outer tines $p$ and $q$, however, are alone pivoted on said bolt, said tines $p$ and $q$ being each bent into a stepped form by offsetting them in a number of places at right-angles, this permitting of bringing the downwardly-bent portions of the outer tines into a widely spaced-apart relation. The intermediate tines $p'$ and $q'$ are fastened by means of bolts $w$ and nuts $x$ to the first offset portion of each of the outer tines $p$ and $q$ respectively. The innermost tines $p^2$ and $q^2$ are fastened by similar means to the second offset portion of each of the outer tines abutting thereon. The inner ends of the tines $q^2$ are pivoted also on the bolt $t$, but the inner ends of the tines $p^2$ are bent upwardly at a small angle at $s$, and extend over and past said bolt $t$ far enough to overlie the spacing-brace $v$ and engage with the latter to limit the spreading apart of the tines. The spacing-braces $u$ and $v$ lie between the inner parts of the tines $p'$ and $p^2$, and $q'$ and $q^2$, and are secured thereto by means of the same bolts which serve to secure said tines together. The ends of these spacing-braces are then curved downwardly and inwardly to form short curved arms $n$ and $o$. These arms are located about midway between the pivot-bolt $t$ and the bend in said tines. A swivel is pivoted to the end of each of these arms, and to the swivels are secured the lower ends of the short chains $l$ and $m$ respectively. A double-ringed link $j$ receives the other swivels $k$ of all the chains $l$ and $m$.

Above the tines is located a structure formed of two parallel plates $a$ and $a'$ connected by bolts or rivets having spacing-collars $z$ between the plates. Swivel-rings are movably secured in the ends of these plates, while other swivel rings or loops $r$ are movably secured to the tines $p'$ and $q'$ at their angles of bending downward. The chains $h$ connect the said swivels on one side while the chains $i$ connect them on the other side of the device. On a cross-bolt $g$ medially located in said plates, is fulcrumed the inner end of a trip-lever $e$. Said lever has, near its fulcrum, an integral depending hook $f$, adapted to detachably support the upper ring of the link $j$. The outer end of the lever $e$ is bent at an angle upwardly and plays between the adjacent ends of said plates and a transverse stop-rod $y$ set between said plates. The plates $a$ and $a'$ may be suspended from a block $b$ containing a sheave $c$, by means of a connecting link $d$.

When the tines of the grapple have been closed together about an object to be moved, the ring on the link $j$ is slipped over the hook $f$. The tines are thus kept locked together when the load is being lifted or transported. To deliver the load, the trip-arm $e$ may be contacted by any stop or suitable means, which throws it up, and pulls the hook $f$ out of the link $j$, and the tines then spread and release the load.

Having described my invention, what I claim as new, and desire to secure by Letters Patent, is:

1. A grapple, comprising, in combination, opposed tines pivoted together, a body located above said tines and composed of bars secured together and spaced apart, linking-connections between the outer angles of certain of said tines and the ends of said bars, a trip-arm pivoted at one end to a cross-shaft located medially between said bars, and having an integral depending hook, short inwardly-curved arms projecting downwardly from the lower edges of certain of said tines and located intermediately between the angles of the latter and their common pivot, linking-connections between the said arms and a common link, said common link being suspended detachably from the hook on said trip-arm.

2. A grapple, comprising, in combination, opposed tines pivoted together, a body located above said tines and composed of bars secured together and spaced apart, linking-connections swiveled to the outer angles of certain of said tines and swiveled to the ends of said bars, a trip-arm pivoted at one end to a cross-shaft located medially between said bars, said arm having an integral depending hook, short inwardly-curved arms projecting inwardly from the lower edges of certain of said tines and located intermediately between the angles of the latter and their common pivot, linking-connections swiveled to the ends of said arms and also to a common link, said link being removably suspended from the hook on said trip-arm.

3. A grapple, comprising, in combination, opposed outer tines whose inner ends are pivoted on a common transverse shaft, and offset to provide seats for the inner ends of a desired number of intermediate tines, intermediately located tines secured to said offset parts of said outer tines, the inner ends of certain of said intermediate tines projecting beyond said pivot-shaft and adapted to act as stops to limit the amount of spread of the grapple, means for suspending said grapple, and means for opening and closing it.

4. A grapple, comprising, in combination, pairs of spaced apart opposed outer tines whose inner ends are pivoted on a common transverse shaft, and each tine being offset to provide seats for the inner ends of a plurality of intermediate tines, intermediately located tines secured to said offset parts of said outer tines, and means for limiting the spread of said opposed tines apart from each other.

5. A grapple, comprising, in combination, pairs of spaced apart opposed outer tines whose inner ends are pivoted on a common transverse shaft, and each tine being offset to provide seats for the inner ends of a plurality of intermediate tines, intermediately located tines secured to said offset parts of said outer tines, means for limiting the spread apart of said opposed tines, a body supported above said tines, linking-means between said body and the outer angles of certain of said tines, a trip-arm having one end pivoted to the middle of said body and having an integral depending hook, and linking-means between the parts of certain of said tines intermediate between their outer angles and their common pivot, and a common link, said link being removably suspended from the hook on said trip-arm.

Signed at Waterloo, Iowa, this 5th day of July, 1910.

RASMUS PEDERSEN.

Witnesses:
O. D. YOUNG,
G. C. KENNEDY.

Copies of this patent may be obtained for five cents each, by addressing the "Commissioner of Patents, Washington, D. C."